United States Patent Office 3,511,811
Patented May 12, 1970

3,511,811
PROCESS FOR THE PREPARATION OF POLYESTERS OF TEREPHTHALIC ACID AND GLYCOLS
Andre Jan Conix, Antwerp, and Lambert Gaston Jeurissen, Mortsel, Belgium, assignors to Gevaert-Agfa N.V., Mortsel, Belgium, a Belgian company
No Drawing. Filed May 27, 1968, Ser. No. 732,017
Claims priority, application Great Britain, June 2, 1967, 25,645/67
Int. Cl. C08g *17/015*
U.S. Cl. 260—75          7 Claims

ABSTRACT OF THE DISCLOSURE

Process for the preparation of polyesters of terephthalic acid and a glycol utilizing in a quantity sufficient to have present in the polycondensation reaction mixture at least 0.005 percent by weight of dissolved germanium dioxide with respect to the weight of glycol terephthalate a preformed catalytic solution of germanium dioxide. The preformed catalytic solution is prepared by dissolving germanium dioxide in water and using this solution in the polycondensation reaction, as such, or mixed with glycol and the water may also be eliminated from the mixture of water and glycol during a separate distillation step.

---

The present invention relates to a process for the preparation of polyesters of terephthalic acid and a glycol, more particularly ethylene glycol, of the type in which a polycondensation reaction is carried out in the presence of a germanium compound as catalyst.

It is known from U.S. patent specification 2,578,660 to use germanium dioxide as catalyst in the above-mentioned polycondensation reaction. Though high molecular weight compounds can be prepared with germanium dioxide as catalyst, the method described is nevertheless impracticable, due to the very low solubility of germanium dioxide in the reaction mixture, which results in undissolved catalyst, remaining in the polymer. The low effective catalyst concentration causes long reaction times and the remaining undissolved catalyst will, during working up of the polymer, obviously entail difficulties such as clogging of the filtering apparatus on melting for extrusion purposes. Moreover, filtering off the very fine undissolved catalyst particles is difficult. If the polymer is used for the fabrication of film, the film will contain inclusions in the form of irregularly distributed points or be hazy. This is inadmissible if the film is to be used as a film base for photographic purposes.

A method has now been found for enhancing the solubility of germanium dioxide in the polycondensation reaction mixture, which in practice makes possible the use of germanium dioxide as catalyst in the preparation of such polyesters.

The invention consists of a process for the preparation of a polyester by the polycondensation of a glycol terephthalate in the presence of germanium dioxide as catalyst, in which at least the polycondensation step is carried out in the presence of a preformed solution of germanium dioxide, said preformed solution being obtained by dissolving germanium dioxide in water in a concentration of up to 1% by weight, and using this solution as such or in admixture with glycol, said glycol having the same formula as the glycol component of the glycol terephthalate, wherein the water can also be eliminated from said mixture of water and glycol during a separate distillation step.

The said preformed solution of germanium dioxide in water, in a mixture of water and a glycol, or in a glycol after the water has been distilled, may be added to the reaction mixture containing preformed glycol terephthalate before the polycondensation step.

The process of the invention may be carried out using direct esterification of terephthalic acid and a glycol or a conversion of terephthalic acid and ethylene oxide, to form the glycol terephthalate monomer. The best results are obtained, however, by a process in which glycol terephthalate is obtained by the transesterification of a dialkyl ester of terephthalic acid, with a glycol, and the polycondensation step, using the said separately preformed solution of germanium dioxide, is carried out subsequent to the said transesterification step. The glycol terephthalate used in the polycondensation step is preferably an ethylene glycol terephthalate.

The polycondensation can be effected batchwise, or as a continuous process.

In the transesterification reaction herein before described any transesterification catalyst can be used, but preferably one that does not colour the polyester which is to be formed, e.g. compounds of alkali metals and alkaline-earth metals, praseodymium, cerium, lanthanum, or salts of zinc, cadmium or manganese, for instance, those described in British patent specification 816,215.

When the polyester is produced by a two-stage process involving a first transesterification step and a second polycondensation step, as hereinbefore described, the preformed solution of germanium dioxide may be added in both the said stages, or in the polycondensation stage only. It is preferred that the germanium dioxide is present in proportions to provide a concentration in the reaction mixture higher than 0.005% e.g. up to 0.02% by weight, based on the glycol terephthalate monomer. Higher concentrations provide no advantage in that no improvement of the polycondensation rate is obtained.

The solubility of germanium dioxide in water is rather small, viz. 4.5 g. per liter at 25° C. However, when boiling germanium dioxide in water for a few minutes this solubility can be increased to 10 g. per liter or 1% by weight. The stable solution thus obtained may be added as catalyst solution to the reaction medium.

It was very surprising to find that no matter what amount of a glycol could be mixed with this aqueous solution without precipitating the dissolved germanium dioxide. Moreover it has also been found that on mixing a glycol with the aqueous germanium dioxide solution, followed by evaporating water from the solution formed, a solution of germanium dioxide in the glycol could be formed having a concentration of up to 3% by weight.

The catalyst solution prepared according to our invention may be added to the reaction mixture at any of the different steps in the polyester manufacture, but at the latest during the polycondensation step. In order to have present in the polycondensation step at least 0.005% by weight of dissolved germanium dioxide with respect to the weight of the glycol terephthalate, the solution of germanium oxide in the glycol after the water has been distilled should have a concentration of at least 0.02% by weight with respect to the glycol.

The thus formed solution of germanium dioxide in glycol may contain much higher concentrations of germanium dioxide, for instance as between 0.15% and 3%, based on the glycol solvent. Such solutions may be used as stock solutions, which at any time after dilution may serve in the polyester preparation. In this way, the germanium dioxide solution can be added before or during the transesterification and before or during the polycondensation reaction. The preparation of such concentrated preformed solution means that they do not have to be made up for each run of polyester and also results in economies in plant requirements.

In forming the germanium dioxide solution, the germanium dioxide can be used in the form as supplied, e.g. calcinated, containing only 0.3% of water or non-calcinated which normally contains about 15% of water but which may also be dried to a water content of about 2%. The dried non-calcinated quality is preferably used.

Certain compounds may also be added to the reaction melt to attain desired effects. For instance stabilising agents such as phosphorus compounds, delustering agents, or colouring agents such as anthraquinone dyes may be added.

When compared with other known polycondensation catalysts such as antimony compounds, titanium compounds and tin compounds, the germanium compounds used in the procedure according to our invention have the advantage of allowing the preparation of nearly colourless and very clear polyesters. If the polyester is intended for the preparation of films to be used as photographic supports, this clearness and absence of colour is of utmost importance. Another advantage of the use of germanium compounds as polycondensation catalysts resides in the fact that the films prepared from the polyesters have very good stretching properties.

The examples given hereinafter especially describe the preparation of polyethylene terephthalate. In one example a germanium dioxide solution in water is directly added as catalyst solution before the polycondensation step. In another example this aqueous solution of germanium dioxide is mixed with ethylene glycol and the water is distilled off, whereby the solubility of germanium dioxide in ethylene glycol is enhanced. This very solution having an increased germanium dioxide content in the example is used as polycondensation catalyst in the preparation of polyethylene terephthalate. The process of the invention is not restricted, however, to the use of germanium dioxide with enhanced solubility in ethylene glycol. According to the same process, the solubility of germanium dioxide can also be increased in other glycols, e.g. in 1,4-di(hydroxymethyl)-cyclohexane. In this way a large number of different nearly colourless and very clear polyesters can be prepared from a glycol of the same structure as the glycol component of the glycol terepthalate since the terephthalic acid itself can be replaced partially in the reaction by another dibasic acid such as e.g. isophthalic acid, sebacic acid, or adipic acid.

The following examples are cited to illustrate the invention. They are not intended to limit it in any way. In these examples the inherent viscosity $\eta_{inh}$, which is a measure of the degree of polycondensation, is calculated from the equation:

$$\eta_{inh} = \frac{\ln \eta_{rel}}{c}$$

wherein $\eta_{rel}$ (the relative viscosity) is found from $$\eta_{rel} = \frac{\text{flow time of solution}}{\text{flow time of solvent}}$$

and wherein $c$ is the concentration. $\eta_{rel}$ is determined at 25° C. for a solution having a concentration $c$ of 0.5 g. of polyester per 100 ccs. of a 60:40 mixture of phenol and sym.-tetrachloroethane.

The crystalline melting point of the polymer is determined by heating a crystallised sample of polyester on the heating stage of a polarising microscope. The temperature of the hot stage is raised at a rate of 0.8° C./min. The crystalline melting point is the temperature at which between crossed nicols the last trace of birefringence disappears.

At the end of the polycondensation period the colour of the molten polyester is measured in a Lovibond Tintometer and recorded in terms of the Lovibond scale. This scale consists of permanent glass filters graduated in a strictly linear scale, from the palest perceptible colour to a fully saturated one, in the three subtractive primary colours red, yellow, and blue. By selecting suitable combinations from these scales, any colour, as well as grey to black, can be matched. This method has been described in "Colorimetric Chemical Analytical Methods," 2 volumes of a loose-leaf text book published by The Tintometer Ltd., Salisbury, England.

EXAMPLE 1

A catalyst solution was made by boiling 1 g. of germanium dioxide in 100 ccs. of water for 20 minutes. A clear 1% solution was obtained. An amount of 0.42 cc. of this solution containing 4.2 mg. of germanium dioxide ($2.10^{-4}$ mole/mole of dimethyl terephthalate) was placed in a glass polymerisation tube of 25 mm. inside diameter together with 38.8 g. of dimethyl terephthalate, 27 g. of ethylene glycol and 8.2 mg. of manganese (II) monomethylterephthalate ($1.10^{-4}$ mole/mole of dimethyl terephthalate), prepared as described in Example 1 of United Kingdom patent specification 816,215. The reactants were heated for 2 hr. at 197° C. under atmospheric pressure. A continuous stream of dry oxygen-free nitrogen was introduced through a capillary tube reaching to the bottom of the reaction tube. The transesterification being finished, the temperature was gradually raised over 30 minutes to 282° C. and the unreacted ethylene glycol distilled off. Subsequently 13 mg. of triphenyl phosphate ($2.10^{-4}$ mole/mole of dimethyl terephthalate) were added as stabiliser. The pressure was reduced to 0.1 to 0.3 mm. of Hg, while the melt was stirred under dry nitrogen. After 3 hr. at 282° C., vacuum was released and polyethylene terephthalate polyester was obtained having an inherent viscosity of 0.715 dl./g. The polyester was clear and had a Lovibond colour combination of 0.8 yellow. Melting point: 266° C., which indicated a very low diethylene glycol content.

EXAMPLE 2

A catalyst solution was made by boiling 1 g. of germanium dioxide in 100 ccs. of water for 20 minutes. A clear 1% solution was obtained. Subsequently 100 ccs. of ethylene glycol were added and from this mixture 100 ccs. mainly consisting of water was distilled. The obtained 1% solution in ethylene glycol remained also clear. An amount of 0.42 cc. of this solution containing 4.2 mg. of germanium dioxide ($2.10^{-4}$ mole/mole of dimethyl terephthalate) was placed in a glass polymerisation tube of 25 mm. inside diameter together with 38.8 g. of dimethyl terephthalate, 27 g. of ethylene glycol and 9.8 mg. of manganese(II) acetate tetrahydrate ($2.10^{-4}$ mole/mole of dimethyl terephthalate). The reactants were heated for 1 hr. at 1197° C. under atmospheric pressure. A continuous stream of dry oxygen-free nitrogen was introduced through a capillary tube reaching to the bottom of the reaction tube. The transesterification being finished, the temperature was gradually raised over 30 minutees to 282° C. and the unreacted ethylene glycol distilled off. The pressure was reduced to 0.1 to 0.3 mm. of Hg while dry nitrogen was bubbled through the stirred melt. After 2 hr. at 282° C. vacuum was released and polyethylene terephthalate polyester was obtained having an inherent viscosity of 0.675 dl./g. The polyester was clear and had a Lovibond colour combination of 0.1 red and 0.9 yellow. Melting point: 267° C., which indicated a very low diethylene glycol content.

We claim:

1. A process for the preparation of a film-forming polyester by the polycondensation of a glycol terephthalate in the presence of germanium dioxide as catalyst, comprising adding to the polycondensation reaction mixture at the latest during the polycondensation of the glycol terephthalate a quantity of a preformed solution of germanium dioxide sufficient to have present in the reaction mixture at least 0.005 percent of germanium dioxide by weight based on the weight of glycol terephthalate present, and polycondensing said glycol terephthalate, said preformed germanium dioxide solution having been prepared by dissolving germanium dioxide in water in a concentration of up to 1% by weight based on the water, then, if desired, further mixing with the resulting aqueous solution a glycol having the same formula as the glycol of the glycol component of the glycol terephthalate so as to obtain a solution containing between .02 and 3% by weight dissolved germanium dioxide based on the weight of said glycol and then, if desired, distilling off the water present in the mixture of water and glycol.

2. A process according to claim 1, in which the said preformed solution of germanium dioxide is added to the reaction mixture containing glycol terephthalate before the polycondensation step.

3. A process according to claim 1, in which germanium dioxide is added to the polycondensation reaction mixture in the form of a preformed solution in water containing up to 1% by weight of dissolved germanium dioxide.

4. A process according to claim 1, in which germanium dioxide is added to the polycondensation reaction mixture in the form of a preformed solution in a mixture of water and glycol containing between 0.15 and 3% by weight of dissolved germanium dioxide, based on the weight of the said glycol.

5. A process according to claim 1, in which germanium dioxide is added to the polycondensation reaction mixture in the form of a preformed solution in a glycol, said solution being obtained by dissolving germanium dioxide in water in a concentration of up to 1% by weight of germanium dioxide, adding said glycol to said aqueous solution so as to obtain a solution containing between 0.15 and 3% by weight of dissolved germanium dioxide based on the weight of the said glycol, and distilling off the water present.

6. A process as claimed in claim 1, wherein the glycol terephthalate used in the polycondensation reaction is obtained by the transesterification of a dialkyl ester of terephthalic acid and a glycol, and wherein the polycondensation step using the said preformed solution of germaanium dioxide is carried out subsequent to the said transesterification step.

7. A process according to claim 1, in which the said glycol terephthalate is ethylene glycol terephthalate.

References Cited

UNITED STATES PATENTS

| | | | |
|---|---|---|---|
| 2,951,060 | 8/1960 | Billica | 260—75 |
| 3,346,541 | 10/1967 | Davies | 260—75 |

WILLIAM H. SHORT, Primary Examiner

L. P. QUAST, Assistant Examiner

U.S. Cl. X.R.
252—430; 260—475